United States Patent [19]
Webb

[11] Patent Number: 5,144,836
[45] Date of Patent: Sep. 8, 1992

[54] LIQUID LEVEL SENSING GAUGE ASSEMBLY AND METHOD OF INSTALLATION

[76] Inventor: R. Michael Webb, 3108 Sherman Ave., Eau Claire, Wis. 54701

[21] Appl. No.: 732,051

[22] Filed: Jul. 18, 1991

[51] Int. Cl.⁵ .......................................... G01F 23/32
[52] U.S. Cl. ...................... 73/319; 73/321; 116/228
[58] Field of Search ............... 73/319, 321; 116/228

[56] References Cited

U.S. PATENT DOCUMENTS

| | | |
|---|---|---|
| 219,702 | 9/1879 | Eckhoff . |
| 1,225,178 | 5/1917 | Rogers . |
| 2,600,341 | 6/1952 | Thompson .......................... 73/313 |
| 2,713,794 | 7/1955 | Burns ................................. 73/321 |
| 2,949,777 | 8/1960 | Ferron ................................ 73/321 |
| 3,009,158 | 7/1963 | Barker ............................... 73/321 |
| 3,148,542 | 9/1964 | Clift ................................... 73/308 |
| 3,482,447 | 12/1969 | Bennett ............................... 73/321 |
| 4,244,219 | 1/1981 | Takahashi ......................... 73/321 X |
| 4,255,859 | 3/1981 | Klieman ............................ 73/321 X |
| 4,988,978 | 1/1991 | Soto .................................. 73/319 X |

FOREIGN PATENT DOCUMENTS 882087 11/1961 United Kingdom .
1105118 12/1965 United Kingdom .

Primary Examiner—Daniel M. Yasich
Attorney, Agent, or Firm—Woodcock Washburn Kurtz Mackiewicz & Norris

[57] ABSTRACT

A liquid level gauge assembly which has particular utility for petroleum products has a threaded cylindrical projection which allows quick installation onto a storage tank. The gauge assembly operates by measuring the displacement of a float member through a filament which extends through a restrictive opening in the outer housing of the gauge assembly. An adapter is connected to the free end of the filament outside the outer housing. The opening is sized so that the adapter is prevented from passing therethrough, thus preventing the filament from retracting completely into the housing. The gauge assembly also includes a transparent cover member which can be removed prior to installation of the gauge assembly to permit quick manual calibration of the indicator hands on the analog display of the gauge assembly.

12 Claims, 2 Drawing Sheets

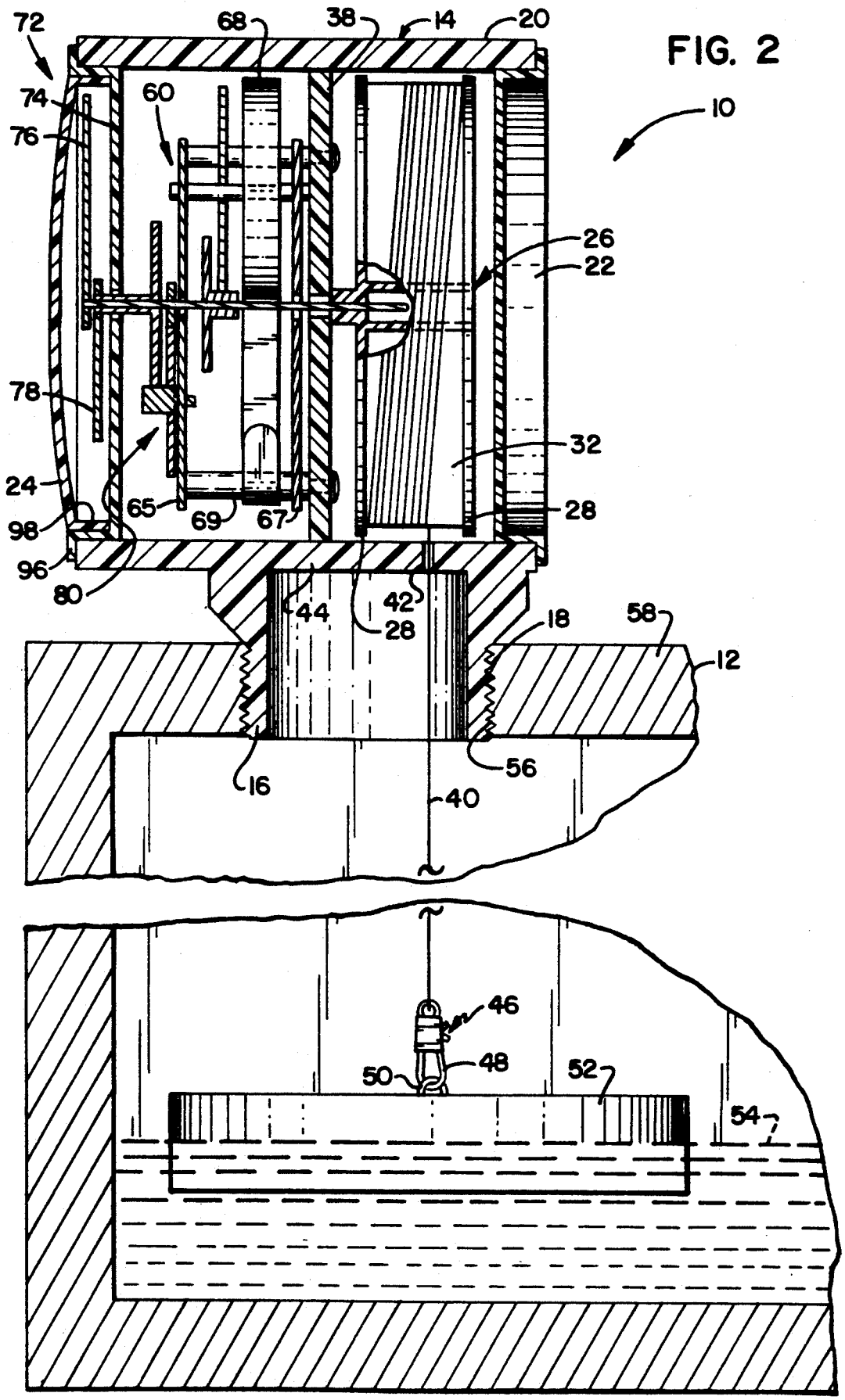

LIQUID LEVEL SENSING GAUGE ASSEMBLY AND METHOD OF INSTALLATION

BACKGROUND OF THE INVENTION

1. Field of the Invention

This invention relates to an improved gauge assembly for monitoring the level of fluid in a storage tank or like container, and to an improved, convenient method for installing such a gauge assembly.

2. Description of the Prior Art

A great variety of devices have been used to determine and provide indications of the liquid level in storage tanks and other such vessels. However, monitoring the level of storage tanks which contain petroleum products or other volatile liquids presents special requirements that have not been fully satisfied by the technology which is in common use today.

Petroleum products such as oil and gasoline contain viscous components which tend to coat any surface which is exposed to them. This effectively precludes the use of visual sight gauges for fluid level monitoring. The volatile nature of such fluids also makes their monitoring with electronic level sensing equipment more dangerous and otherwise problematic.

Float level gauges have been used in the past to monitor the level of petroleum based products. Such a gauge is disclosed in U.S. Pat. No. 3,482,447 to Bennett. This device includes an analog gauge that is synchronized with an internal drum. Wrapped about the drum is a gauge line that is connected to a float element. The drum is biased in a first rotary direction by an elongated coil-type spring, which keeps the gauge line in tension. As the float element rises or falls in response to the level of the liquid within a storage tank, the analog display reflects the resultant rotation of the drum.

Mechanically, this type of gauge has proven effective for monitoring the fluid level for petroleum base products. However, the installation of such gauges can be relatively difficult, particularly in storage tanks which are already filled. The Bennett gauge, for example, is apparently intended to be mounted to a storage tank by a flange which is bolted onto the tank. To mount such a flange, holes need to be drilled into the outer wall of the tank. The float needs to be introduced into the tank, and then connected to the gauge line. The gauge line, due to the tension exerted on it by the spring biased drum, is likely to completely retract into the housing of the gauge during this process, thereby exacerbating the difficulty of installation.

It is particularly important that installation time be kept to a minimum while working on tanks which are already in operation, due to the possible release of volatile and toxic vapors from the tank while the tank is open to atmosphere.

It is also important that a gauge be quickly and easily calibrated to reflect the liquid level within a tank after it is installed. In an analog gauge, this requires the position of the indicating hands to be mechanically adjustable. It is important, however, that such adjustability not be achieved at the expense of reducing the vapor tightness of the gauge housing, which is essential to avoid releasing vapor into the atmosphere.

It is clear that there has existed a long and unfilled need in the prior art for a liquid level gauge which is convenient to install, which can be quickly calibrated to reflect the level of liquid within a storage tank to which it is mounted, which is mechanically simple and inexpensive to manufacture, and which protects the environment against escape of vapors from the storage tank.

SUMMARY OF THE INVENTION

Accordingly, it is an object of the invention to provide a liquid level gauge which can be quickly and easily installed on a storage tank.

It is further an object of the invention to provide a liquid level gauge which is mechanically simple and inexpensive to produce.

It is also an object of the invention to provide a liquid level gauge that is vapor tight when operative so as to protect the environment against the release of fumes from the storage tank to which it is mounted.

It is yet further an object of the invention to provide a liquid level gauge which is particularly suited for monitoring the level of petroleum products within the storage tank.

In order to achieve the above and other objects of the invention, a gauge assembly for measuring the level of liquid in a storage tank or like container according to a first aspect of the invention includes an outer housing; a spool member rotatably mounted within the outer housing; indicator structure on the outer housing for displaying a value which corresponds to the rotary position of the spool member; spring structure for biasing the spool member in a first rotary direction; a filament secured to and wound about the spool member so as to wind onto the spool member when the spool member is rotated in a first rotary direction, adaptor structure, connected to a second, free end of the filament, which is adapted to securing to a float member, the adapter structure being positioned outside of the outer housing; and structure defining an opening in the outer housing through which the filament passes, the opening being sized so as to prevent passage of the adapter structure therethrough, whereby a customer can install the assembly by securing a float member to the structure and allowing the weight of the float member to play our filament against the bias of the spring structure without fear of the filament retracting into the housing.

According to a second aspect of the invention, a method of installing a gauge assembly for measuring the level of the liquid in a storage tank or like container includes: (a) providing a gauge assembly having an outer housing with a threaded cylindrical projection, an analog display having at least one exposed hand and a filament extending through an opening in the housing within the threaded projection, the filament having an adapter attached to a free end thereof, the filament being biased to retract into the housing so that the adapter is drawn against the housing proximate the opening; (b) connecting the adapter to a float member; (c) dropping the float member through a threaded hole in a storage tank; (d) screwing the threaded cylindrical projection into the threaded hole in the storage tank; (e) manually adjusting the hand on the analog display to reflect the level of liquid in the tank, thereby calibrating the gauge; and (f) placing a transparent cover over the analog display so as to protect the atmosphere against any vapor leakage from the storage tank via the outer housing.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 2 is a partially-fragmented cross-sectional view through the gauge assembly depicted in FIG. 1 and the storage tank.

DETAILED DESCRIPTION OF THE PREFERRED EMBODIMENT(S)

Figure 1:
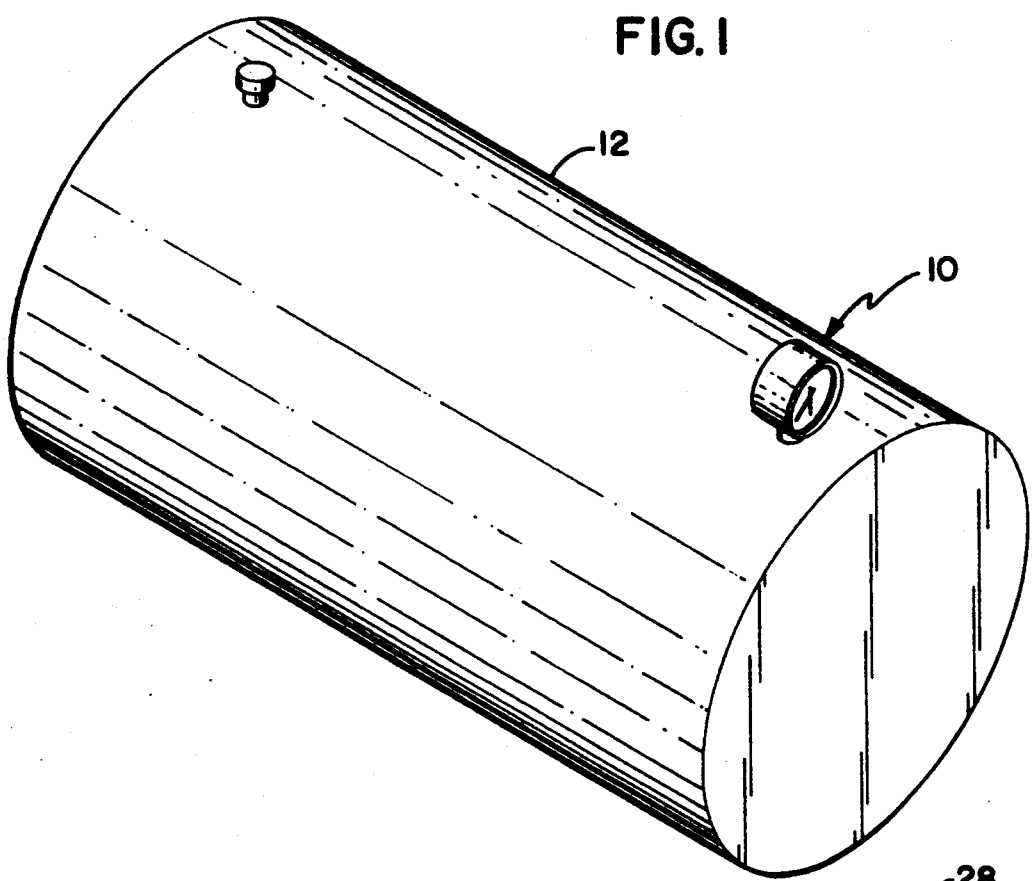
FIG. 1 is a perspective view of a gauge assembly constructed according to a preferred embodiment of the invention shown in its mounted position upon a storage tank.

Referring now to the drawings, wherein like reference numerals designate corresponding structure throughout the views, and particularly referring to FIGS. 1 and 2, a gauge assembly 10 constructed according to a preferred embodiment of the invention is shown mounted on a storage tank 12 for storing liquid such as petroleum products.

Referring now to FIG. 2, gauge assembly 10 includes an outer housing 14 which is fabricated from a material which is resistant to degradation from petroleum products, such as polyvinylchloride (PVC). Outer housing 14 includes a lower cylindrical projection 16 having a helical threaded portion 18 defined thereon, for purposes which will be described in greater detail below. Cylindrical projection 16 is unitary with a cylindrical wall portion 20 which defines the main outer periphery of the outer housing 14. A rear cover 22 is sealingly fitted onto an opening defined by the rear of the cylindrical wall portion 20. By removing rear cover 22, maintenance personnel can gain access to the mechanical elements contained in the rear portion of the outer housing 14, which will be described in appropriate detail below. Outer housing 14 further includes a transparent cover member 24 which is sealingly fitted to a corresponding opening defined by a forward edge of cylindrical wall portion 20. The purpose and advantage created by transparent cover member 24 will be discussed in greater detail below.

Outer housing 14 is also preferably fabricated from a material which has a light color, so as to absorb as little heat as possible from direct sunlight. As a result, the installation of a gauge assembly 10 according to the invention will affect the internal temperature of a storage tank 12 to the least extent possible.

Referring again to FIG. 2, a spool member 26 is mounted for rotation within a rear portion of outer housing 14. Spool member 26 includes a drum portion 32 upon which a filament member 40 is connected to and wound about, as may be seen in FIG. 2. Spool member 26 further includes a pair of raised rims 28, as may best be seen in FIG. 3 for ensuring that filament 40 stays wound upon drum portion 32. Spool member 26 further includes an axially extending nipple portion 30 which projects from a forward face of spool member 26 and bears against a rearward surface of a bulkhead member 38 that is integral with outer housing 14. Nipple portion 30 includes a splined axial bore which mates with a splined portion 34 of a central shaft 36, best seen in FIG. 3. Spool member 26 thus is constrained to rotate with central shaft 36, as will be discussed in greater detail below.

Referring again to FIG. 2, an opening 42 is defined in a portion of outer housing 14 which is within cylindrical projection 16. An adapter 46 is connected to a free end of filament 40 outside of outer housing 14. Opening 42 is sized so as to prevent adapter 46 from passing therethrough, for reasons which will be set forth in greater detail below.

Adapter 46 preferably used is an adapter clip or hook of the type preferably used in recreational fishing equipment to connect a fishing hook to a fishing line. Adapter 46 includes a hook portion 48 which is normally closed but can be opened by retracting a latch element in a manner that is widely known. During normal operation of gauge assembly 10, as depicted in FIG. 2, hook element 48 is hooked onto a metallic loop 50 of a float member 52 float material which resists degradation from petroleum based liquids, such as polyvinylchloride (PVC). Filament 40 also preferably possesses such qualities, and is preferably fabricated from a nylon based material.

Referring again to FIG. 2, the threaded portion 18 of cylindrical portion 16 allows gauge assembly 10 to be screwed into storage tank 12 during installation. To accommodate this, a threaded opening 56 is provided within storage tank 12. A solid plug may be provided within threaded opening 56 of storage tank 12 when a gauge assembly 10 is not installed in the storage tank 12. As a result, a gauge assembly 12 may be installed in storage tank 12 without making mechanical alterations to storage tank 12 or gauge assembly 10 during the installation procedure.

Figure 3:
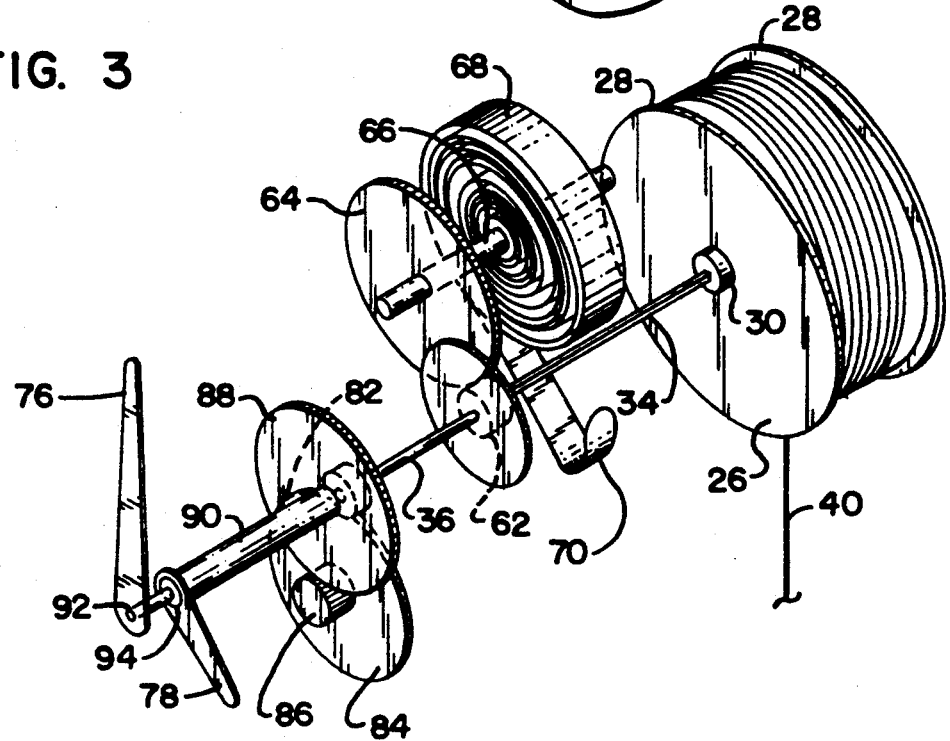
FIG. 3 is a diagrammatical view of certain mechanical elements within the outer housing of the gauge assembly depicted in FIGS. 1 and 2.

Referring now to FIGS. 2 and 3, it will be seen that central shaft 36 extends through an opening in bulkhead 38 and that a spring assembly 60 is connected thereto to provide a rotational bias to spool member 26. As a result, spool member 26 is biased to rotate in a direction that will tend to retract filament 40, thus causing filament 40 to remain in tension during operation so as to give accurate measurement results. Looking now to FIG. 3, it will be seen that spring assembly 60 includes a first pinion 62 that is fixed to rotate with respect to central shaft 36, and a first spurgear 64 which is intermeshed with first pinion 62. First spurgear 64 is fixed to rotate about an axle 66 that is supported at both ends by first and second plate members 65,67, respectively. Plate members 65,67 are spaced apart by four spacer sleeves 69 which in turn are fixed to bulkhead 38 by rivet-like elements which may be seen in FIG. 2. A clock-type spring 68 which is wound from flat spring steel stock has a first, radially inner end fixed to axle 66, and a second, free end 70 bent back in a hook-shaped configuration over a spacer sleeve 69, as may be seen in FIG. 2. Spring 68 is prewound during manufacturing to exert a rotational bias through axle 66, first spurgear 64 and first pinion 62 in a manner that will be mechanically evident to those skilled in the art to achieve the desired rotational biasing of spool member 26. During maintenance, the simple construction of spring assembly 60 allows spring 68 to be rewound by simply removing rear cover 22 and manually rotating spool member 26. In practice, though, the need for such rewinding will be limited, for reasons discussed below.

Gauge assembly 12 further includes an indicator assembly 72 which is responsive to rotation of central shaft 36, and thus, by extension, to rotation of spool member 26 and the linear displacement of filament 40 during operation of the gauge assembly 10. Indicator assembly 72 includes a gear train 80 which includes a second pinion 82 which is fixed to rotate with central shaft 36, and a second spurgear 84 which is intermeshed with second pinion 82. A third pinion 86 is mounted for rotation with second spurgear 84 and is intermeshed with third spurgear 88, as is also best seen in FIG. 3. Third spurgear 88 is mounted for rotation with a sleeve 90 which is mounted coaxially about and is free to rotate with respect to central shaft 36. A first hand member 76 of the analog gauge display is mounted directly to central shaft 36 via a frictional mount 92. A second hand member 78 is likewise mounted to sleeve 90 by a frictional mount 94. Frictional mounts 92,94 allow the hands 76,78 to be manually rotated with respect to shaft 36 and sleeve 90, respectively, during calibration of gauge assembly 10. Second pinion 82, second spurgear 84, third pinion 86, and third spurgear 88 thus constitute a gear reduction drive for maintaining a predetermined synchronization between the first and second analog display hands 76,78.

Indicator assembly 72 further includes a face insert 74 which is sealingly inserted into the forward opening defined by the forward edge of the cylindrical wall portion 20 of outer housing 14. Face element 74 includes a forward face behind the hands 76,78 upon which indicia may be printed. Face element 74 further has a cylindrical recessed surface defined therein which is preferably concentric about the axis of central shaft 36. Transparent cover member 24 preferably includes a cylindrical flange 98 having an outer surface which is sized to be tightly received within the cylindrical recessed surface 96 so as to provide a vapor tight seal between the surface 96 and the flange 98 when cover member 24 is installed onto the gauge assembly 10. For certain applications, an adhesive (not shown) may further be used to provide a secure vapor tight seal between surface 96 and flange 98. The mechanically simple construction of gauge assembly 10 permits inexpensive manufacturing and reliability in operation. Preferably, gauge assembly 10 is sold as a kit wherein float member 52 and transparent cover member 24 are provided separately from the rest of the assembly 10. Spring 68 is prewound during manufacturing, and filament 40 is retracted within outer housing 14 to the extent that adapter 46 is pulled against the portion 44 of outer housing 14 which is inside cylindrical projection 16 which is to say, adjacent opening 42. The presence of adaptor 46 and opening 42 thus prevent filament 40 from retracting completely within outer housing 14, which could otherwise be a great inconvenience during installation and maintenance. To install the assembly 10 on a storage tank 12, any plug which is in threaded opening 56 must first be withdrawn. Adapter 46 is then pulled away from opening 42, and hook 48 is exposed and hooked onto the loop 50 of float member 52. Float member 52 may then be dropped through the threaded opening 56 in the outer wall 58 of storage tank 12. At this point, the threaded portion 18 of cylindrical projection 16 is screwed into the threaded opening 56 within the outer wall 58 of storage tank 12. The assembly 10 is then screwed in so as to be oriented in the desired direction for reading the liquid level of the tank 12. At this point, the gauge assembly 10 is ready to be calibrated. This is done by manually adjusting the first and second hands 76,78 to reflect the known level of liquid within storage tank 12. Once this is accomplished, transparent cover member 24 is installed onto the outer housing 14 so that cylindrical flange 98 is sealed against the cylindrical recess surface 96 of face element 74. In certain applications, it may be desirable to first place a contact adhesive on cylindrical flange 98 to ensure complete, vapor tight sealing between flange 98 and cylindrical recess surface 96.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A gauge assembly for measuring the level of a liquid in a storage tank or like container, comprising:
   an outer housing;
   a spool member rotatably mounted within said outer housing;
   indicator means on said outer housing for displaying a value which corresponds to the rotary position of said spool member;
   spring means for biasing said spool member in a first rotary direction;
   a filament secured to and wound about said spool member so as to wind onto said spool member when said spool member is rotated in said first rotary direction;
   an adapter clip means, connected to a second, free end of said filament, which is adapted for securing to a float member, said adapter means being positioned outside of said outer housing; and
   means defining an opening in said outer housing through which said filament passes, said opening being sized so as to prevent passage of said adapter means therethrough, whereby a customer can install said assembly by securing a float member to said adapter means and allowing the weight of the float member to pay out filament against the bias of said spring means without fear of said filament retracting into said outer housing.

2. An assembly according to claim 1, wherein said outer housing includes a cylindrical projection having a helical thread defined on an outer surface thereof, whereby said assembly may be quickly and conveniently installed on a storage tank.

3. An assembly according to claim 2, wherein said outer housing is fabricated from a material which is resistant to damage from petrochemicals.

4. An assembly according to claim 3, wherein said material is polyvinylchloride.

5. An assembly according to claim 2, wherein said outer housing is constructed to be vapor tight when installed on a storage tank so that vapors from the storage tank are precluded from escaping to atmosphere.

6. An assembly according to claim 5, wherein said outer housing includes a transparent cover member over said indicator means for maintaining the vapor tight status of said outer housing.

7. An assembly according to claim 2, wherein said indicator means comprises an analog clock-like display having band members whose position can be manually adjusted during installation and calibration of said assembly.

8. An assembly according to claim 7, wherein said outer housing includes a removable transparent cover member over said indicator means for permitting adjustment of said hand members during calibration while maintaining the vapor tight status of said outer housing during operation.

9. An assembly according to claim 1, wherein said spring means comprises a clock-type spring wound from flat stock.

10. An assembly according to claim 1, wherein said filament is fabricated from a material which will not corrode and which is resistant to petrochemicals.

11. An assembly according to claim 10, wherein said material is nylon.

12. A method of installing a gauge assembly for measuring the level of a liquid in a storage tank or like container, comprising:

(a) providing a gauge assembly having an outer housing with a threaded cylindrical projection, an analog display having at least one exposed hand and a filament extending through an opening in the housing within the threaded projection, the filament having an adapter clip attached to a free end thereof, the filament being biased to retract in to the housing so that the adapter is drawn against the housing proximate the opening;

(b) connecting the adapter to a float member;

(c) dropping the float member through a threaded hole in a storage tank;

(d) screwing the threaded cylindrical projection into the threaded hole in the storage tank;

(e) manually adjusting the hand on the analog display to reflect the level of liquid in the tank, thereby calibrating the gauge; and (f) placing a transparent cover over the analog display so as to protect the atmosphere against any vapor leakage from the storage tank vapor the outer housing.

* * * * *